US011775734B2

(12) United States Patent
Sharma et al.

(10) Patent No.: US 11,775,734 B2
(45) Date of Patent: Oct. 3, 2023

(54) MULTIMODAL INPUT CONTEXTUAL FONT RECOMMENDATIONS

(71) Applicant: Adobe Inc., San Jose, CA (US)

(72) Inventors: Sanat Sharma, Austin, TX (US); Jing Zheng, San Jose, CA (US); Jayant Kumar, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/534,937

(22) Filed: Nov. 24, 2021

(65) Prior Publication Data

US 2023/0161944 A1    May 25, 2023

(51) Int. Cl.
   *G06F 40/109*    (2020.01)
   *G06N 3/02*    (2006.01)
   *G06N 5/02*    (2023.01)

(52) U.S. Cl.
   CPC ............. *G06F 40/109* (2020.01); *G06N 3/02* (2013.01); *G06N 5/02* (2013.01)

(58) Field of Classification Search
   None
   See application file for complete search history.

(56) References Cited

U.S. PATENT DOCUMENTS

| | | | | |
|---|---|---|---|---|
| 5,586,242 A * | 12/1996 | McQueen, III | ....... | G06F 40/109 345/467 |
| 10,970,458 B1 * | 4/2021 | Dhanuka | ............... | G06F 40/151 |
| 11,157,693 B2 * | 10/2021 | Srinivasan | ............ | G06F 40/253 |
| 11,422,996 B1 * | 8/2022 | Muhlstein | ............... | G06F 16/22 |
| 11,423,072 B1 * | 8/2022 | Chen | ....................... | G06F 16/51 |
| 11,508,392 B1 * | 11/2022 | Sohail | .................... | H04M 11/10 |
| 2005/0075880 A1 * | 4/2005 | Pickover | ............... | G06F 40/253 704/270 |
| 2019/0114318 A1 * | 4/2019 | Zhou | ..................... | G06F 40/284 |
| 2019/0392325 A1 * | 12/2019 | Lange | ..................... | G06N 5/02 |
| 2021/0117773 A1 * | 4/2021 | Sollami | .................... | G06T 3/40 |
| 2021/0209289 A1 * | 7/2021 | Kan | ....................... | G06F 40/109 |

(Continued)

FOREIGN PATENT DOCUMENTS

CN    112800190 A    *    5/2021    .........    G06F 16/3329

OTHER PUBLICATIONS

Intention Detection Based on Siamese Neural Network With Triplet Loss by Fuji Ren et al. (Year: 2020).*

(Continued)

*Primary Examiner* — Mandrita Brahmachari
(74) *Attorney, Agent, or Firm* — NICHOLSON DE VOS WEBSTER & ELLIOTT LLP

(57) ABSTRACT

Embodiments are disclosed for receiving a modal input including at least one of a text input or an image input. The method may include extracting an intent label from the modal input. The method may further include generating, by an intent embedding generator, an intent embedding from the intent label. The method may further include comparing the intent embedding to a plurality of candidate font embeddings to obtain one or more candidate fonts based on a similarity of the intent embedding to the plurality of candidate font embeddings in an embedding space. The method may further include identifying a recommended font based on the similarity of the intent embedding to a selected candidate font embedding of the plurality of candidate font embeddings.

20 Claims, 12 Drawing Sheets

(56) References Cited

U.S. PATENT DOCUMENTS

| | | | |
|---|---|---|---|
| 2021/0357187 A1* | 11/2021 | Clement | G06F 40/274 |
| 2021/0374349 A1* | 12/2021 | Liu | G06N 5/022 |
| 2022/0188520 A1* | 6/2022 | Iso-Sipila | G06F 40/295 |
| 2022/0222432 A1* | 7/2022 | Meng | G06F 16/583 |
| 2022/0253719 A1* | 8/2022 | Ramos | G06F 40/30 |
| 2022/0284049 A1* | 9/2022 | Christensen | G06F 16/337 |
| 2022/0358280 A1 | 11/2022 | Shirani et al. | |
| 2023/0016729 A1* | 1/2023 | Pouran Ben Veyseh | G06F 40/30 |

OTHER PUBLICATIONS

Alonso, O., et al., "Crowdsourcing a Subjective Labeling Task: A Human-Centered Framework to Ensure Reliable Results", Microsoft Res., Redmond, 2014, 10 pages.

Amare, N., et al., "Seeing Typeface Personality: Emotional Responses to Form as Tone", IEEE International Professional Communication Conference, Oct. 2012, 10 pages.

Barsoum, E., et al., "Training Deep Networks for Facial Expression Recognition with Crowd-Sourced Label Distribution", In Proceedings of the 18th ACM International Conference on Multimodal Interaction, Sep. 24, 2016, 6 pages.

Carneiro, G., et al., "Supervised Learning of Semantic Classes for Image Annotation and Retrieval", IEEE Transactions on Pattern Analysis and Machine Intelligence, vol. 29, No. 3, Mar. 2007, pp. 394-410.

Claude Coulombe, "Text data augmentation made simple by leveraging NLP cloud APIS", arXiv preprint arXiv:1812.04718, 2018, pp. 1-33.

Devlin, J., et al., "BERT: Pre-training of Deep Bidirectional Transformers for Language Understanding", Proceedings of NAACL-HLT, 2019, pp. 4171-4186.

Doyle, J. R., et al., "Dressed for the Occasion: Font-Product Congruity in the Perception of Logotype", Journal of Consumer Psychology, vol. 16, No. 2, 2006, pp. 112-123.

Eva R. Brumberger, "The Rhetoric of Typography: The Awareness and Impact of Typeface Appropriateness", Technical Communication, vol. 50, No. 2, May 2003, pp. 224-231.

Eva R. Brumberger, "The Rhetoric of Typography: The persona of typeface and text", Technical Communication, vol. 50, No. 2, May 2003, pp. 206-223.

Felbo, B., et al., "Using millions of emoji occurrences to learn any-domain representations for detecting sentiment, emotion and sarcasm", arXiv:1708.00524v, Oct. 7, 2017, 13 pages.

Gao, T., et al., "SimCSE: Simple Contrastive Learning of Sentence Embeddings", Computer Science, May 18, 2022, 17 pages.

Geng, X., et al., "Facial Age Estimation by Learning from Label Distributions", IEEE Transactions on Pattern Analysis and Machine Intelligence, vol. 35, No. 10, Oct. 2013, pp. 451-456.

Greene, D., et al., "Using Crowdsourcing and Active Learning to Track Sentiment in Online Media", Research Gate, Jan. 2010, 13 pages.

Henderson, P. W., et al., "Impression Management Using Typeface Design", Conditional Acceptance at the Journal of Marketing, Ms 02-168, Apr. 2004, 36 pages.

Jo Mackiewicz, "Audience Perceptions of Fonts in Projected PowerPoint Text Slides", Technical Communication, vol. 54, No. 3, Aug. 2007, pp. 295-307.

Joseph L. Fleiss, "Measuring Nominal Scale Agreement Among Many Raters", Psychological Bulletin, vol. 76, No. 5, 1971, pp. 378-382.

Juni, S., et al., "Emotional and persuasive perception of fonts", Perceptual and Motor Skills, vol. 106, No. 1, 2008, pp. 35-42.

Kar, S., et al., "Folksonomication: Predicting Tags for Movies from Plot Synopses Using Emotion Flow Encoded Neural Network", In Proceedings of the 27th International Conference on Computational Linguistics, Aug. 15, 2018, 13 pages.

Kingma, D. P., et al., "Adam: A method for stochastic optimization", arXiv: 1412.6980v9, Jan. 30, 2017, pp. 1-15.

Kulahcioglu, T., et al., "FontLex: A Typographical Lexicon based on Affective Associations", In Proceedings of the Eleventh International Conference on Language Resources and Evaluation, 2018, pp. 62-69.

Kullback, S., et al., "On Information and Sufficiency", The Annals of Mathematical Statistics, vol. 22, No. 1, Mar. 1951, pp. 79-86.

Mackiewicz, J., et al., "Why People Perceive Typefaces to Have Different Personalities", International Professional Communication Conference, 2004 IPCC 2004 Proceedings, 2004, pp. 304-313.

Mallinson, J., et al., "Paraphrasing Revisited with Neural Machine Translation", Proceedings of the 15th Conference of the European Chapter of the Association for Computational Linguistics, vol. 1, 2017, pp. 881-893.

Mohammad, S. M., et al., "Crowdsourcing a Word-Emotion Association Lexicon", Computational Intelligence, vol. 29, No. 3, Aug. 2013, pp. 1-25.

Nguyen, A. T., et al., "Probabilistic Modeling for Crowdsourcing Partially-Subjective Ratings", Proceedings of the AAAI Conference on Human Computation and Crowdsourcing, vol. 4, 2016, pp. 149-158.

O'Donovan, P., et al., "Exploratory Font Selection Using Crowdsourced Attributes", ACM Transactions on Graphics, vol. 33, No. 4, Article No. 92, Jul. 27, 2014, pp. 1-9.

Pennington, J., et al., "GloVe: Global Vectors for Word Representation", Proceedings of the 2014 conference on empirical methods in natural language processing (EMNLP), 2014, pp. 1532-1543.

Reimers, N., et al., "Sentence-BERT: Sentence Embeddings using Siamese BERT-Networks", Computer Science, Aug. 27, 2019, 11 pages.

Rodrigues, F., et al., "Sequence Labeling with Multiple Annotators", Machine Learning, vol. 95, No. 2, Oct. 4, 2013, pp. 165-181.

Saif, M. Mohammad, "Obtaining Reliable Human Ratings of Valence, Arousal, and Dominance for 20,000 English Words", Proceedings of the 56th Annual Meeting of the Association for Computational Linguistics, vol. 1, 2018, pp. 174-184.

Saif, M. Mohammad, "Word Affect Intensities", Proceedings of the 11th Edition of the Language Re- sources and Evaluation Conference (LREC-2018), 2018, pp. 174-183.

Salminen, J. O., et al., "Inter-Rater Agreement for Social Computing Studies", In 2018 Fifth International Conference on Social Networks Analysis, Management and Security (SNAMS), 2018, 9 pages.

Shinahara, Y., et al., Serif or Sans: Visual Font Analytics on Book Covers and Online Advertisements, International Conference on Document Analysis and Recognition (ICDAR), 2019, 6 pages.

Shirani, A., et al., "Learning Emphasis Selection for Written Text in Visual Media from Crowd-Sourced Label Distributions", Proceedings of the 57th Annual Meeting of the Association for Computational Linguistics, 2019, pp. 1167-1172.

Shirani, A., et al., "Let me Choose: From Verbal Context to Font Selection", Computer Science, 2020, pp. 8607-8613.

Srinivasan, R., et al., "Crowdsourcing in the Absence of Ground Truth—A Case Study", Computer Science, 2019, 7 pages.

Urkullu, A., et al., "On the evaluation and selection of classifier learning algorithms with crowdsourced data", Applied Soft Computing, vol. 80, 2019, pp. 832-844.

Wolf, T., et al., "Transformers: State-of-the-Art Natural Language Processing", Proceedings of the 2020 Conference on Empirical Methods in Natural Language Processing: System Demonstrations, 2020, pp. 38-45.

Xin Geng., "Label distribution learning", IEEE Transactions on Knowledge and Data Engineering, vol. 28, No. 7, 2016, pp. 1-14.

Yang, J., et al., "Leveraging Crowdsourcing Data for Deep Active Learning an Application: Learning Intents in Alexa", Proceedings of the 2018 World Wide Web Conference, 2018, pp. 23-32.

Yang, X., et al., "Deep Label Distribution Learning for Apparent Age Estimation", In Proceedings of the IEEE international conference on computer vision workshops, 2015, 7 pages.

Non-Final Office Action, U.S. Appl. No. 17/489,474, dated May 19, 2023, 12 pages.

* cited by examiner

FIG. 7

MULTIMODAL INPUT CONTEXTUAL FONT RECOMMENDATIONS

BACKGROUND

In visual designs, textual information requires the use of fonts with different properties. Whether it is books, magazines, flyers, ads, or social media posts, different typefaces are commonly used to express non-verbal information and add more dimensions to the text. Access to a broad range of existing fonts can be useful in selecting an appropriate font. Due to the nature of large font libraries available, many users or applications select a default font and rarely select from the diverse and rich fonts available for selection. Font library size also makes searching a time consuming and difficult task and such searching usually relies on visual similarity, which limits the selection.

These and other problems exist with regard to font recommendation in electronic creative service systems.

SUMMARY

Introduced here are techniques/technologies that relate to generating font recommendations based on intents extracted from a user input. In particular, in one or more embodiments, a font recommendation system can use a machine learning model to generate an intent embedding that represents intents extracted from a user input. The intent embedding can be compared to font embeddings generated for fonts of a font library that represent intents associated with those fonts to identify similar fonts. These similar fonts may then be recommended to the user.

More specifically, in one or more embodiments, the systems and methods use a combination of machine learnings models to provide font recommendations for an intent of a user input. For example, the systems and methods train an intent embedding generator that can represent intents of fonts in a font library and intents of user input. The intent embedding generator is trained to improve clustering and anti-bias the font recommendations by comparing the intents and overcome bias limitations of visual similarity. By using the intent embedding generator, user inputs including images or text can be compared to fonts in a library of fonts. By comparing intents rather than a visual similarity, the systems and methods provide a visually diverse grouping of font recommendations that are still associated with similar intents.

For instance, in order to provide font recommendations, the systems and methods determine a set of intents for a user input and a set of intents for each font in a font library. The intent embedding generator can generate an embedding space to compare the set of intents. The font recommendations can be provided by computing a group of fonts that are nearby to the embedding that represents the set of intents for the user input. The group of fonts include one or more fonts that can be recommended by the system because of the similar intent.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 7 illustrates an example of a multimodal font recommendation with an input text in accordance with one or more embodiments;

DETAILED DESCRIPTION

One or more embodiments of the present disclosure include a font recommendation system. The font recommendation system can receive a text input or an input image. The font recommendation system can extract a set of intents from the text input or the input image. The font recommendation system can generate an intent embedding to represent the set of intents in an embedding space. The font recommendation system can generate an embedding space using a trained machine learning model. The embedding space can include multiple font embeddings that represent sets of intents associated with each of the fonts. The font recommendation system compares the intent embedding with the multiple font embeddings in the embedding space. The font recommendation system determines a recommended font based on a distance between a location in the embedding space of the intent embedding with a location of the multiple font embeddings in the embedding space.

As discussed, conventional techniques lack the ability to recommend visually diverse fonts that have similar intents. As a result, conventional systems often recommend a small set of commonly used fonts that are visually similar and limits the diversity of the font recommendations. The use of visual similarity and a limited set of fonts creates a narrow bias and inferior recommendations.

To address these and other deficiencies in conventional systems, embodiments perform font recommendation based on multiple intents (e.g., top 5 intents) associated with an input image or input text and multiple font embeddings. Embodiments generate a richer distribution of font recommendations for a given input text or input image. Embodiments compares font similarity metric using intent similarity rather than similarity by appearance. This yields a diverse set of related font suggestions because fonts can be visually dissimilar while being associated with a similar intent.

Figure 1:
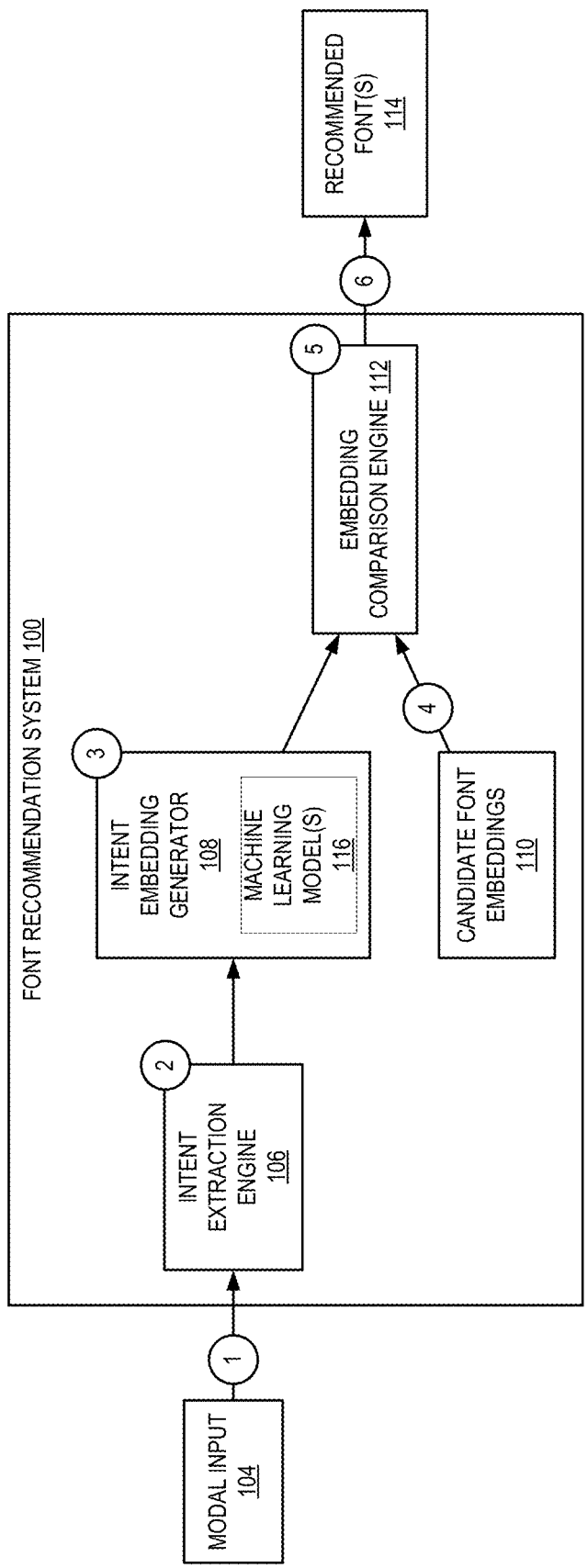
FIG. 1 illustrates a diagram of a process multimodal input contextual font recommendation in accordance with one or more embodiments.

FIG. 1 illustrates a diagram of a process of multimodal input contextual font recommendation in accordance with one or more embodiments. As depicted in FIG. 1, a font recommendation system 100 can include an intent extraction engine 106, an intent embedding generator 108, candidate font embeddings 110, and embedding comparison engine 112.

As depicted in FIG. 1, intent extraction engine 106 of the font recommendation system 100 can receive a modal input 104 at numeral 1. The modal input 104 can include a text input or an image file. For example, as used herein, the term "image file" refers to any digital image, visual content, or illustration. For example, the term "image file" includes digital files with the following, or other, file extensions: .GIF, .JPEG, .TIFF, .BMP, .AI, .PDF, or .PNG. The term "image file" also includes two or more images (e.g., frames) in a digital video. Accordingly, although much of the description herein is phrased in terms of a digital image, it will be appreciated that the disclosure can apply to groups of digital images that contain similar content.

In some embodiments, a user can provide an input image from an image store (e.g., on their device, such as a camera roll, file system, or application, etc., or from a storage service, such as a remote file system, cloud-based storage service, etc.) or captured by a camera. The input image may include one or more objects that may include letters, words, or other visual characters. In other embodiments, the font recommendation system 100 can receive the input image from another computing device, such as a content server, a media distribution system, or the like.

In other embodiments, a user can provide input text from a word processing application (e.g., on their device, such as a notes application, text file, or a speech-to-text application, etc., or from a storage service, such as a remote file system, cloud-based storage service, etc.) or captured by an input device such as a keyboard. The input text may include one or more words that may include letters, special characters, or other visual characters. In other embodiments, the font recommendation system 100 can receive the input text from another computing device, such as a content server, a media distribution system, or the like.

At numeral 2, the intent extraction engine 106 can determine a set of intents from the modal input 104. For example, the intent extraction engine 106 can include an intent model, such as a transformer-based model, that can recognize text, numerals, or other characters in an image input, determine one or more intents of the text, numerals, or other characters from an image input, or determine one or more intents of a text input. The intent model may be a neural network trained to extract textual intents from a given text. For instance, the intent model can be trained to generate sets of intents for text and font pairs that are extracted from a content library of texts. As used herein a "neural network" may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in the data. Additional details with respect to the use of neural networks within the font recommendation system are discussed below with respect to FIGS. 1-12.

In some embodiments, the intent extraction engine 106 can receive an image input. The intent extraction engine 106 may be a transformer-based model, such as a visual transformer. The intent extraction engine 106 can detect one or more objects, words, or characters included in the image input. The intent extraction engine 106 can determine an intent associated with the objects, words, or characters based on a learned relationship between the objects, words, or characters and a semantic meaning of an intent. In a non-limiting example, the image input may include a wedding cake. The intent extraction engine 106 may extract the cake shape, colors, style of decoration, adjacent decorations, or the like and determine a set of intents that include, but is not limited to: "wedding," "party," "cake" or the like.

In some embodiments, the intent extraction engine 106 can receive input text. The intent extraction engine 106 can include a transformer-based model, such as a sentence transformer to detect and classify one or more words, characters, or a language of the text input. The intent extraction engine 106 can determine an intent associated with the one or more words, characters, or a language of the text input by learning a relationship between the one or more words, characters, or a language of the text input, and a semantic meaning of an intent. In a non-limiting example, the input text may include a phrase "happy birthday!" or "feliz cumpleanos!" The intent extraction engine 106 may extract the words "birthday" or "cumpleanos" and determine a set of intents that include, but is not limited to: "age," "party," "cake" or the like.

At numeral 3, the intent embedding generator 108 receives the set of intents extracted from the modal input 104 and generates an intent embedding that represents the set of intents. An example of the intent embedding can be a position within a multi-dimensional vector such as an embedding space that represents the set of intents. The intent embedding generator 108 can generate the intent embedding using the machine learning model(s) 116 that may be trained such that similar intents, or sets of intents, when provided to the model, result in intent embeddings that are "close" within the embedding space.

In some embodiments, the machine learning model(s) 116 can include a sentence transformer trained on a natural language processing benchmark such that the machine learning model(s) 116 can learn a mapping of the set of intents. For example, the machine learning model(s) 116 can be trained using the General Language Understanding Evaluation (GLUE) benchmark. The intent embedding generator 108 may generate a location in the embedding space for the set of intents. The intent embedding can represent intents extracted from of any number of data types. In the examples described below, an intent embedding that represents the intents associated with the modal input 104 is compared to font embeddings in the embedding space. As discussed, the machine learning model is trained to generate embeddings associated with similar intents to be "close" within the embedding space. Accordingly, an intent embedding generated based on the intents extracted from the modal input can be compared to the font embeddings generated based on the intents associated with a library of fonts in the high dimensional embedding space to determine similar fonts (e.g., fonts associated with font embeddings that are "close" or within a threshold distance of the intent embedding in the embedding space).

In another embodiment, the machine learning model(s) 116 can include a neural network trained with triplet loss to improve diversity of the font recommendations output by the font recommendation system 100. For example, the machine learning model(s) 116 may be a combination of a trained Font Bert model on top of a pretrained Contrastive Bert Model. The machine learning model(s) 116 can be trained by learning a relationship between a set of intents for a font (e.g., sampling a top 5 intents out of a total 10 intents for a font). In this example, the machine learning model(s) 116 may be trained by Siamese learning with Triplet Loss (instead of the classic Contrastive Loss).

As shown in FIG. 1, the font recommendation system 100 can include candidate font embeddings 110. For instance, during an offline process, the font recommendation system 100 can generate candidate font embeddings 110 from sets of text and font pairs, where each resulting font embedding is associated with a different font. As discussed above with respect to processing the modal input, the intent embedding generator 108 can include machine learning model(s) 116 that are trained to generate a font embedding from the intents extracted from each text and font pair. By applying the same machine learning model(s) 116 to a library of fonts offline, the candidate font embeddings 110 can be generated. Each font embedding of the candidate font embeddings represents the intents associated with a font which may be recommended by the font recommendation system. Additional details of the offline process are described at least with respect to FIG. 4.

At numeral 5, the embedding comparison engine 112 can compare the candidate font embeddings 110 with the intent embedding generated from the modal input 104. For instance, the embedding comparison engine 112 can compute distances (e.g., using L1 distance, L2 distance, or other distance metric) between the candidate font embeddings e.g., the font embeddings generated offline) and the intent embedding generated from the modal input. The embedding comparison engine 112 can determine a recommended font by determining a minimum distance between one or more candidate font embeddings 110 and the intent embedding generated from the modal input 104. In some embodiments, the font recommendation system 100 may recommend one or more fonts associated with one or more embeddings that are within a threshold distance of the intent embedding. Alternatively, the font recommendation system 100 may recommend a top 5, 10, or other number of fonts based on the corresponding top 5, 10, etc. font embeddings, regardless of any threshold distance. Additional details are described at least with respect to FIGS. 5-7.

At numeral 6, the font recommendation system 100 can output the one or more recommended fonts 114. For instance, the font recommendation system 100 can present, via a user interface, the recommended font(s) 114 by applying the fonts to an input text, an example text, or through other visualization techniques. In some embodiments, a list of recommended fonts may be displayed via the user interface. In some examples, the recommended font 114 can include font attributes such as character spacing, text effects (e.g., bold, italics, etc.), a character size, or the like. The font recommendation system 100 can also communicate the recommended font 114 to another computing system for additional processing.

In some embodiments, the font recommendation system 100 can output a set of recommended fonts 114. For example, the font recommendation system 100 can output multiple recommended fonts based on a threshold proximity between intent embedding and one or more candidate font embeddings 110.

Figure 2:
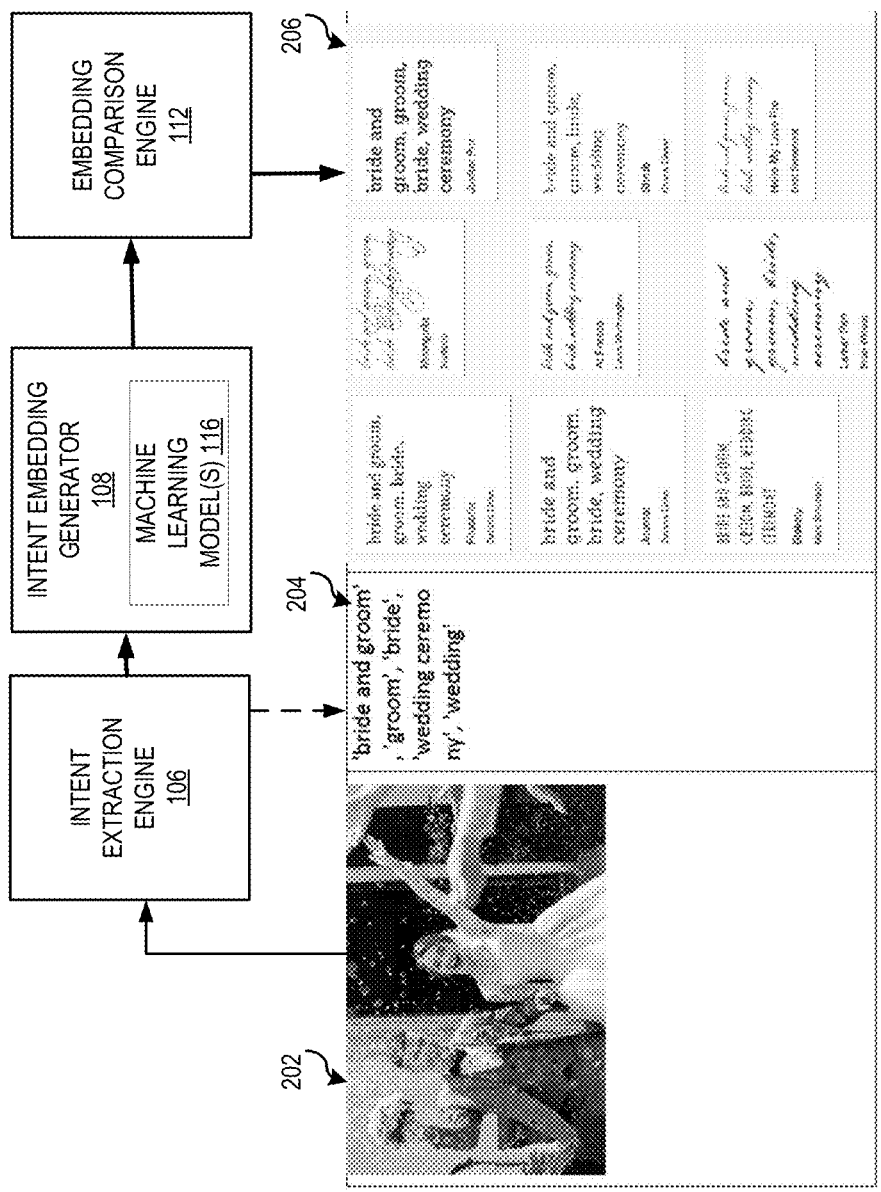
FIG. 2 illustrates a diagram of an example of font recommendation for an input image in accordance with one or more embodiments.

FIG. 2 illustrates a diagram of an example of generating a font recommendation for an input image in accordance with one or more embodiments. As shown in FIG. 2, the intent extraction engine 106 can receive an input image 202. The intent extraction engine 106 can extract a set of intents 204 from the input image 202. In this example, the input image 202 depicts a wedding event with flowers, and two people in formal attire. The intent extraction engine 106 extracts a set of intents 204 that includes example intents such as "bride and groom" and "wedding ceremony."

As depicted in FIG. 2, the intent extraction engine 106 can output the set of intents 204 to the intent embedding generator 108. It should be understood that while the set of intents 204 are depicted in FIG. 2, the set of intents 204 may be provided to the intent embedding generator in machine readable form. The intent embedding generator 108 may generate an intent embedding for the set of intents 204 based on the set of intents 204.

The set of intents 204 are processed as described above by the intent embedding generator 108 and the embedding comparison engine 112. As depicted in FIG. 2, the embedding comparison engine 112 outputs a set of recommended fonts 206. In some embodiments, the embedding comparison engine 112 may output any number of recommended fonts based on a similarity of the intent embedding of the input image 202 and one or more candidate font embeddings, a threshold number of recommendations, or a user determined number of recommendations. As illustrated by FIG. 2, the set of recommended fonts 206 includes a visually diverse set of fonts that have similar positions in the embedding space which indicates that they are associated with similar intents. The set of recommended fonts 206 may include additional details about each font such as a font name, creator, or other metadata. The set of recommended fonts 206 can be presented to a user via a user interface so that the user can select a font from the set of recommended fonts 206.

Figure 3:
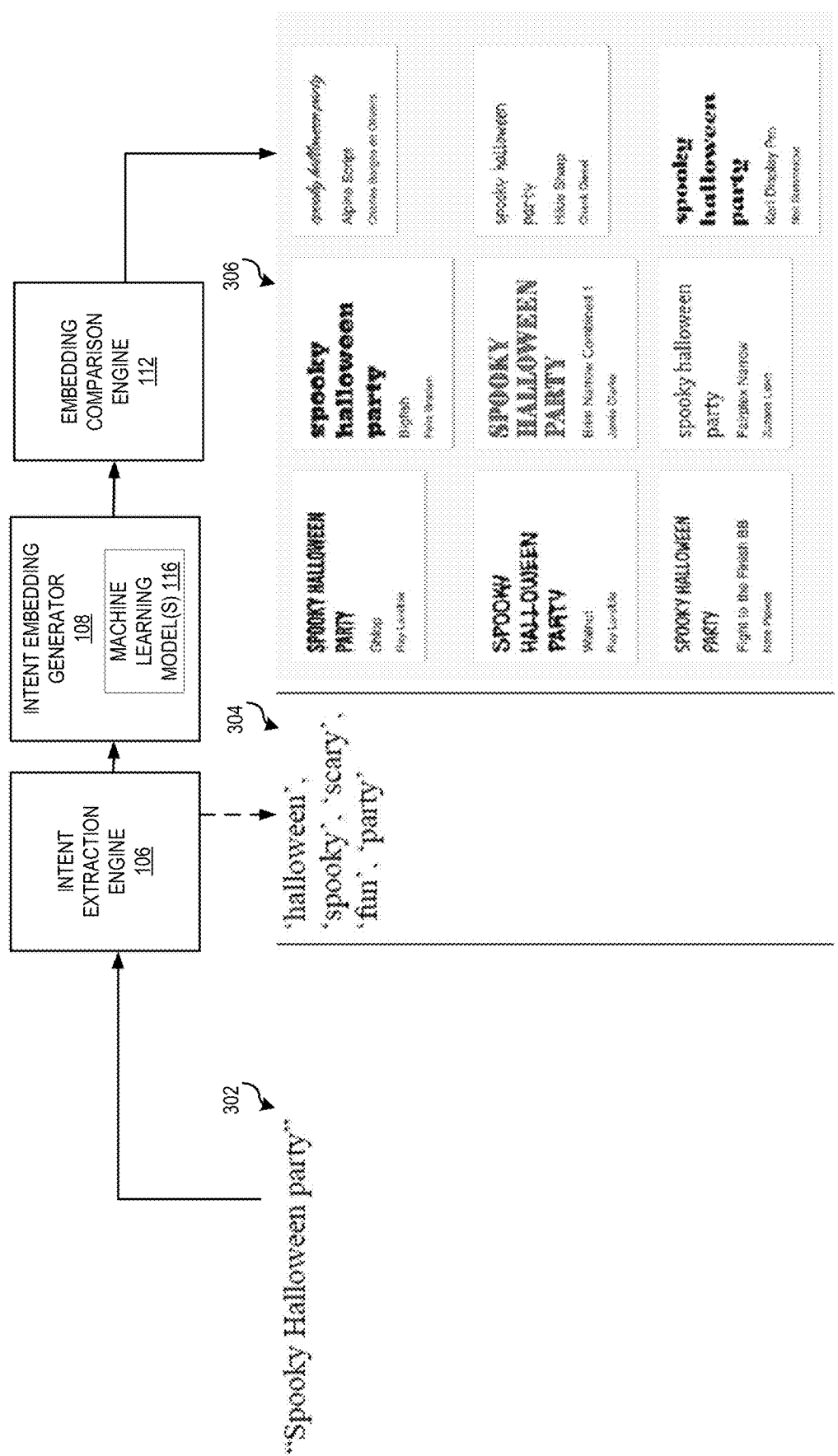
FIG. 3 illustrates a diagram of an example of font recommendation for an input text in accordance with one or more embodiments.

FIG. 3 illustrates a diagram of an example of generating a font recommendation for input text in accordance with one or more embodiments. As shown in FIG. 3, the intent extraction engine 106 can receive input text 302. The intent extraction engine 106 can extract a set of intents 304 from the input text 302. In this example, the input text describes a "Spooky Halloween party." The intent extraction engine 106 extracts a set of intents 304 that includes example intents such as "Halloween," "spooky," "scary," and "fun." At inference time, the intent extraction engine 106 returns the top intents for the input text in a weighted manner. The intent extraction engine 106 can return intents that each have a score associated with them. In another example, for a text input of "Halloween party at my house at 7 pm", the following exemplary intent scores might be returned: {("Halloween", 0.64), ("party", 0.21), ("fun", 0.01), ("event", 0.01) . . . }. The aggregate score of all intents can be equal to 1, as the scores can represent a probability distribution. In this example, the Halloween intent has the highest score, it is given a greater rank. In this case, "Halloween" has the greatest score followed by "party." The intents and scores are provided to the intent embedding generator 108 and the embedding generated for font retrieval is specific to a particular ordered combination of intents. For instance, in one example, the intents returned may be ordered {"fun", "scary", "spooky", "Halloween"}. The resulting fonts recommended from this set of intents would be different than if the intents returned had the order of {"Halloween", "spooky", "scary", "fun"} as the intent with the greatest score will have a greater weight on the recommended fonts.

As depicted in FIG. 3, the intent extraction engine 106 can output the set of intents 304 to the intent embedding generator 108. The intent embedding generator 108 may use machine learning model(s) 116 to generate an intent embedding for the set of intents 304 based on the set of intents 304.

The set of intents 304 are processed as described above by the intent embedding generator 108 and the embedding comparison engine 112. As depicted in FIG. 3, the embedding comparison engine 112 outputs a set of recommended fonts 306. The set of recommended fonts 306 includes a visually diverse set of fonts having similar positions in the embedding space. The set of recommended fonts 306 may include additional details about each font such as a font name, creator, or other metadata. The set of recommended fonts 306 can be presented to a user via a user interface so that the user can select a font from the set of recommended fonts 306.

Figure 4:
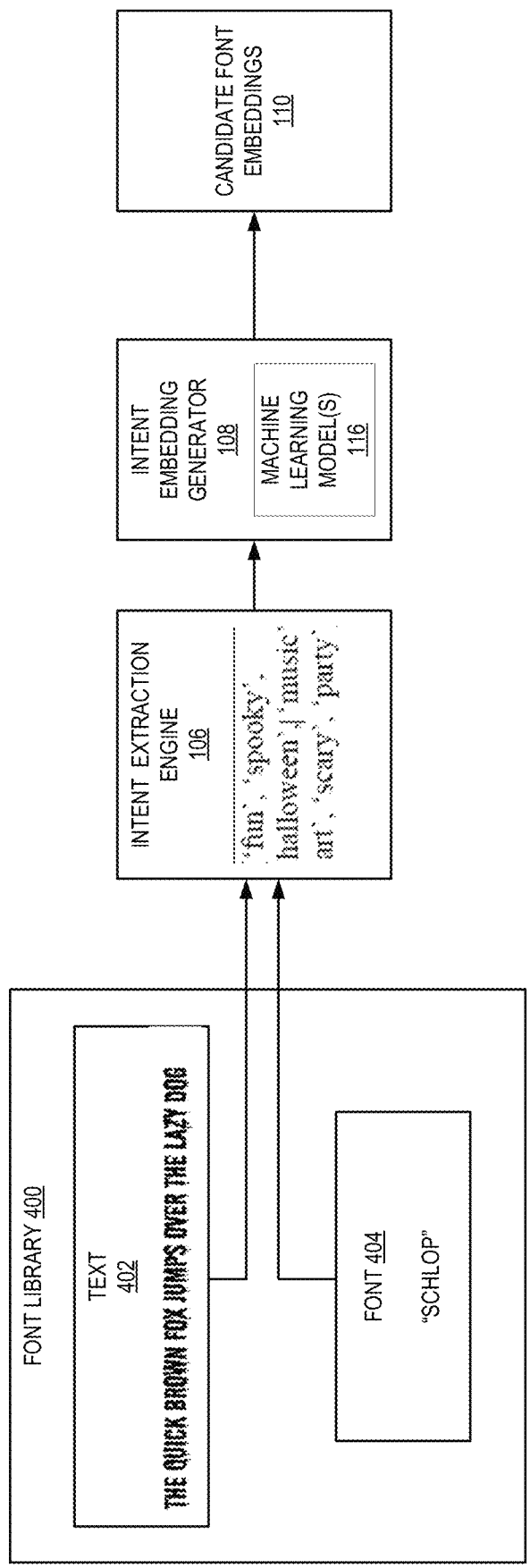
FIG. 4 illustrates an example of a process for generating candidate font embeddings in accordance with one or more embodiments.

FIG. 4 illustrates an example of a process for generating candidate font embeddings in accordance with one or more embodiments. For instance, the font recommendation system can generate font embeddings for a library of fonts that may be recommended to a user based on sets of text and font pairs associated with the library of fonts.

The font recommendation system may include a library of fonts 400 which may be recommended to a user. In some embodiments, sets of text and font pairs, such as text 402 and font 404 may be generated corresponding to each font in the font library. Although only a single pair of text and font is shown in FIG. 4, in various embodiments such a pair may be generated for each font in the font library. In some embodiments, the text 402 and font 404 may be obtained from stock designs, previous user designs, or the like. The intent extraction engine 106 can extract a set of intents for each pair of text and font. The intent extraction engine 106 can be an intent model as described above. The intent extraction engine 106 can output the set of intents for each pair of text and font in the font library to the intent embedding generator 108.

The intent embedding generator 108 receives the output of the intent extraction engine 106 and generates a candidate font embedding for each font to represent a set of learned relationships between the fonts based on representing the intents of each font in the embedding space. As discussed above, the intent embedding generator can be a sentence transformer or a trained neural network that generates an embedding for each font that represents the intents of the fonts. The intent embedding generator can generate similar embeddings (e.g., embeddings that are close in embedding space) for fonts having similar intents and dissimilar embeddings (e.g., embeddings that are distant in embedding space) for fonts having dissimilar intents. An example of the embedding space is depicted with regard to FIG. 5.

Figure 5:
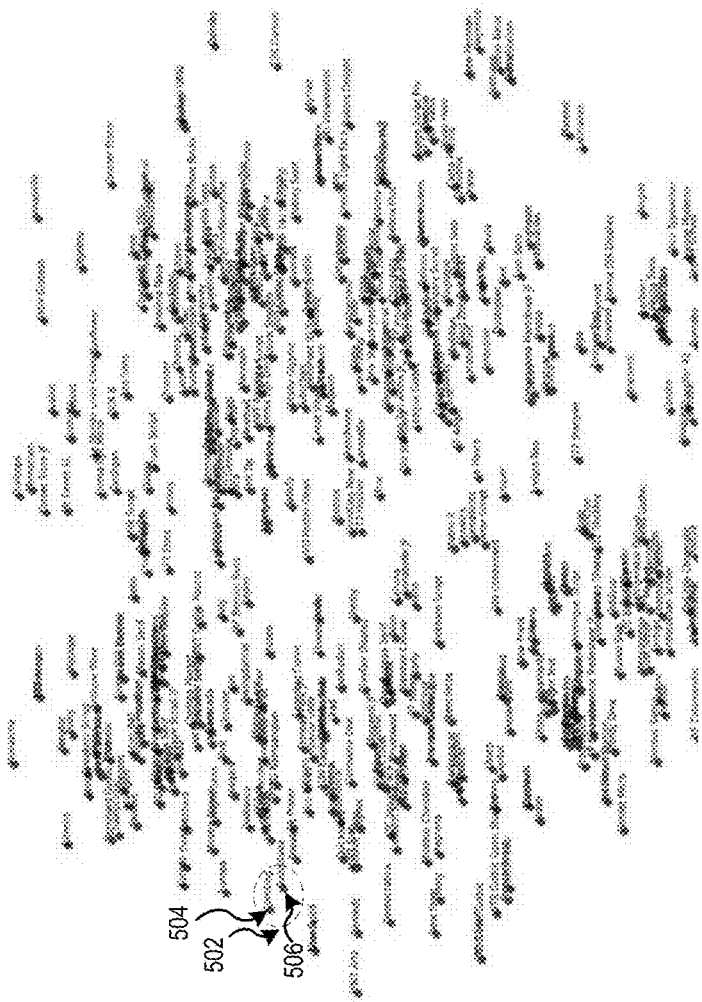
FIG. 5 illustrates an example of an embedding space in accordance with one or more embodiments.

Turning briefly to FIG. 5, FIG. 5 illustrates an example of the embedding space 500 in accordance with one or more embodiments. For instance, as described above, the font embeddings in embedding space 500 can be generated by the intent embedding generator 108 as a vector space that represents intents of each given font. The embedding space 500 identifies fonts that are associated with similar intents and thus is not limited by visual similarity. In one example, a cluster 502 contains two fonts with similar intents. In this example, a first font embedding 504 is associated with a first font 508 called "CornDog" and a second font embedding 506 is associated with a second font 510 called "Sudestada." As illustrated by FIG. 5, the intent embedding generator generates a plurality of font embeddings so that the font recommendation system can use intent similarity as the relationships between the font embeddings represent a similarity of the intent associated with each font. Thus, the font recommendation system is able to provide visually dissimilar fonts that have similar intents. By using the intent similarity of the font, the font recommendation system provides a more diverse set of font recommendations as compared with conventional systems.

Returning to FIG. 4, the intent embedding generator 108 outputs the candidate font embeddings 110. Each font embedding of the candidate font embeddings 110 represents the intents associated with a font, such as described above. As discussed, the candidate font embeddings 110 can be compared with an intent embedding generated based on the modal input 104 to identify similar fonts as described above.

Figure 6:
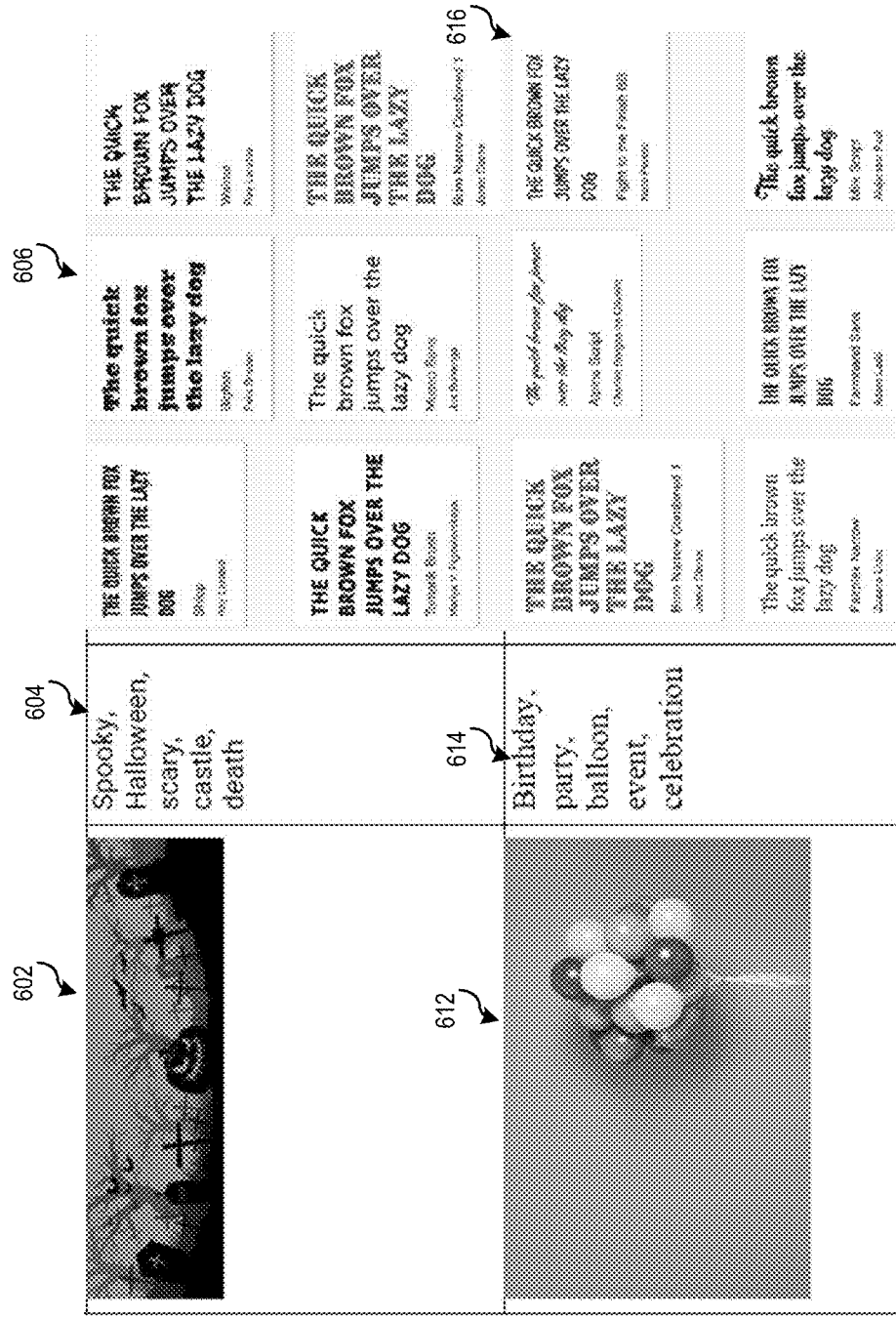
FIG. 6 illustrates an example of a multimodal font recommendation with an input image in accordance with one or more embodiments.

FIG. 6 illustrates an example of multimodal font recommendation with an input image in accordance with one or more embodiments. As described above, particularly with regard to FIG. 2, FIG. 6 depicts a first image input 602 and a second image input 612. The intent extraction engine can extract a first set of intents 604 and a second set of intents 614 from the respective images. The intent extraction engine can output the first set of intents 604 and the second set of intents 614 to the intent embedding generator. The intent embedding generator can generate an intent embedding for the first set of intents 604 and the second set of intents 614. The first set of intents 604 and second set of intents 614 are processed as described above. The embedding comparison engine outputs a first set of recommended fonts 606 and a second set of recommended fonts 606. The first set of recommended fonts 606 and the second set of recommended fonts 616 can be presented to a user via a user interface so that the user can select a font from each set of recommended fonts.

Figure 7:
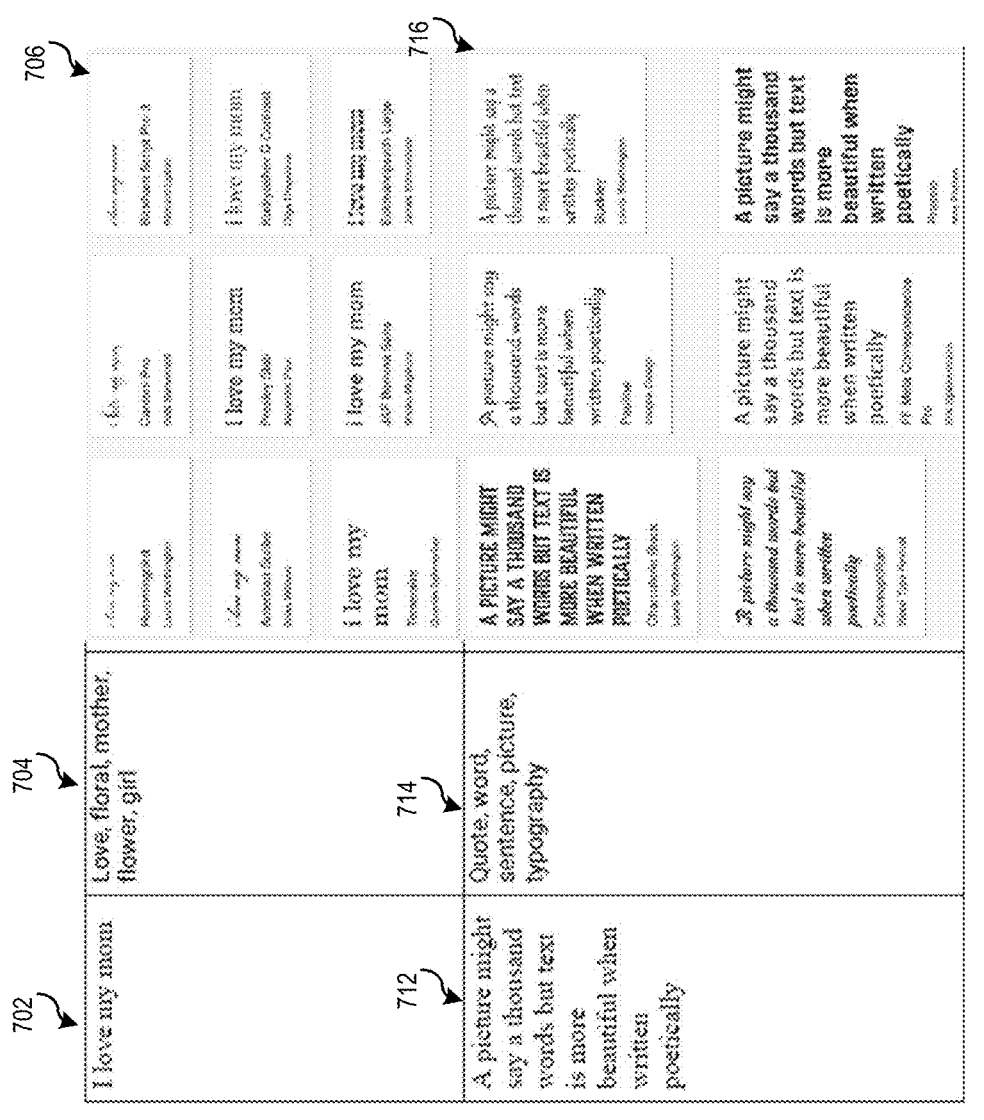

FIG. 7 illustrates an example of a multimodal font recommendation with an input text in accordance with one or more embodiments. As described above, particularly with regard to FIG. 3, FIG. 7 depicts a first text input 702 and a second text input 712. The intent extraction engine can output the first set of intents 704 and the second set of intents 714 to the intent embedding generator. The intent embedding generator can generate an intent embedding for the first set of intents 704 and the second set of intents 714. The first set of intents 704 and second set of intents 714 are processed as described above. The embedding comparison engine outputs a first set of recommended fonts 706 and a second set of recommended fonts 706. The first set of recommended fonts 706 and the second set of recommended fonts 716 can be presented to a user via a user interface so that the user can select a font from each set of recommended fonts.

Figure 8:
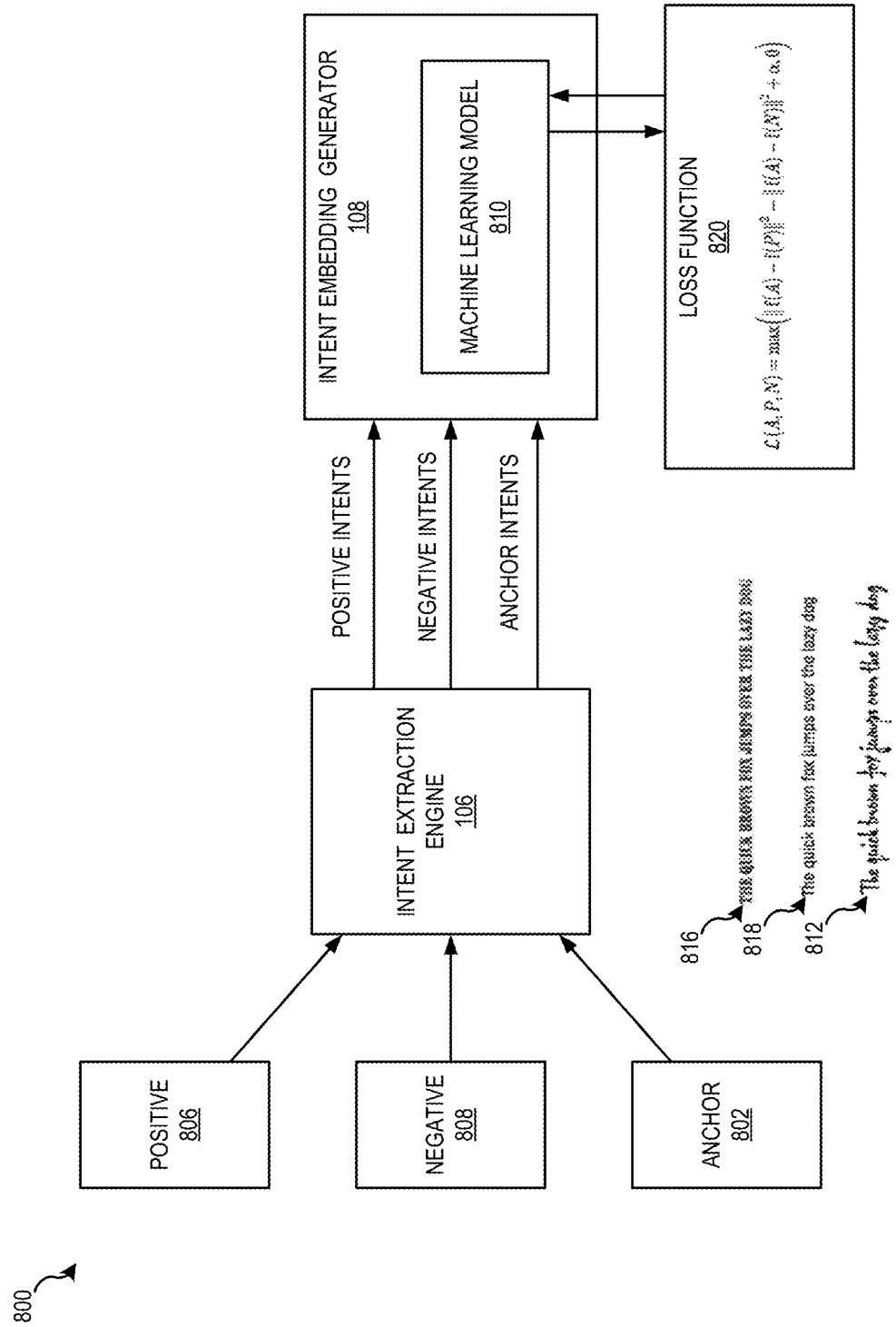
FIG. 8 illustrates an example of a Siamese training process of the intent embedding generator in accordance with one or more embodiments.

FIG. 8 illustrates an example of a Siamese training process 800 of the intent embedding generator 108 in accordance with one or more embodiments. For instance, the intent embedding generator 108 may be trained using a Siamese training approach. An anchor font 802, which can be visually depicted by anchor text 812, can be processed by intent extraction engine 106. The intent extraction engine 106 can extract a set of anchor intents from the anchor font 802. The intent extraction engine 106 can output the set of anchor intents to the intent embedding generator 108.

During the training process, a ranking is used in the training set to train the intent embedding generator 108 to associate each font with a set of weighted intents. In a non-limiting example, a font "Shlop" that can be used with the following intents: "Halloween": 36 times, "fun": 5 times, "scary": 5 times, "happy": 1 time. The number of times each intent is used with a font can be used to apply a weight to each intent relative to the font. Returning to the example above, "Halloween" had the greatest score, and the font "Shlop" has "Halloween" as the greatest occurring intent, the font recommendation system will recommend the font "Shlop" more often for Halloween intent than for fun intent. Each font has a weighted distribution of intents at training time of the intent embedding generator 108.

The intent extraction engine 106 can also receive additional fonts including a positive example font 806, which can be visually depicted by positive example text 816, and negative example font 808, which can be visually depicted by negative example text 818. The positive example font 806 and negative example font 808 can be selected based on similarity of the intents associated with the positive example font 806 and dissimilarity of intents associated with the negative example font 808 with respect to the anchor font 802. The intent extraction engine 106 can extract a set of positive intents from the positive example font 806 and a set of negative intents from the negative example font 808. The intent extraction engine 106 can output the set of positive intents and the set of negative intents to the intent embedding generator 108.

The intent embedding generator can use machine learning model 810 and apply loss function 820 to anchor intents, positive intents, and negative intents to train the machine learning model(s) 810 to generate an embedding space that represents relationships between the intents associated with the anchor font 802, the negative example font 808, and the positive example font 806. The machine learning model 810 minimizes a distance between the anchor intent and the positive intent while maximizing distance between the anchor intent and the negative intent. As a result, the machine learning model 810 learns to generate embeddings for similar intents to be "close" in the embedding space and embeddings for dissimilar events to be "far" in the embedding space.

As illustrated by FIG. 8, the machine learning model 810 can apply a triplet loss function that can be a Euclidean distance function represented by $\mathcal{L}(A,P,N) = \max(\|f(A)-f(P)\|^2 - \|f(A)-f(N)\|^2 + \alpha, 0)$, where A represents the anchor intent, P represents the positive intent, and N represents the negative intent, $\alpha$ is a margin between the positive intent and negative intent and f is an embedding.

As described above, the intent extraction engine 106 can include an intent model that is a neural network trained to extract textual intents. The intent model can be trained using texts that are associated with topic tags such as events such as "Halloween" and "Christmas" or other characteristics such as "happy," "balloon," or "encouraging." In some examples, the intent model can generate sets of intents for text and font pairs that are extracted from a content library of texts. The intent model can generate training data including a text, font, and intent that can be used to train any of the machine learning models described herein.

Figure 9:
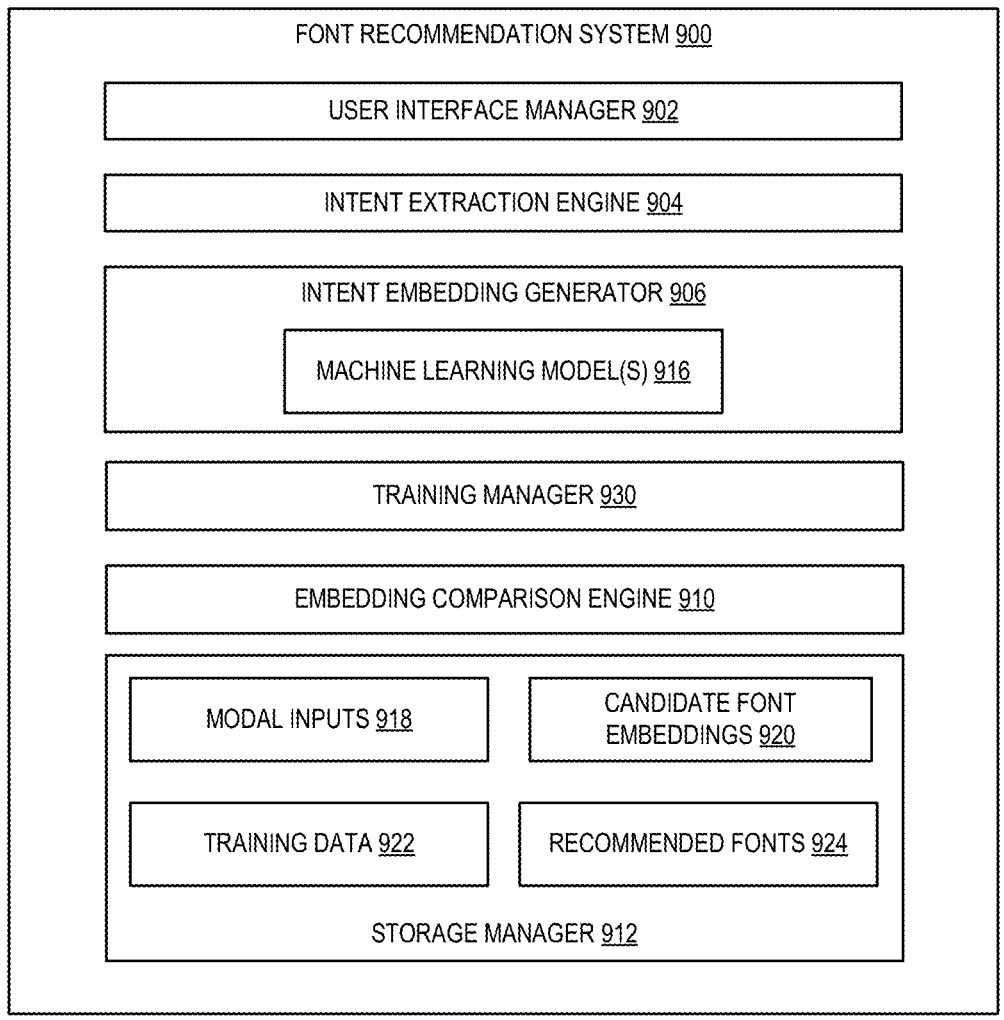
FIG. 9 illustrates a schematic diagram of font recommendation system in accordance with one or more embodiments.

FIG. 9 illustrates a schematic diagram of font recommendation system 900 in accordance with one or more embodiments. As shown, font recommendation system 900 may include, but is not limited to, a user interface manager 902, an intent extraction engine 904, an intent embedding generator 906, an embedding comparison engine 910, and storage manager 912. The storage manager 912 includes modal inputs 918, candidate font embeddings 920, training data 922, and recommended fonts 924.

As illustrated in FIG. 9, the font recommendation system 900 includes a user interface manager 902. For example, the user interface manager 902 allows users to provide input images or input text to the font recommendation system 900. In some embodiments, the user interface manager 902 provides a user interface through which the user can upload an image or text file, input text using a user input device, or initiate capture of an image from a camera. Alternatively, or additionally, the user interface may enable the user to select a remote file, either by providing an address (e.g., a URL or other endpoint) associated with the remote file or connecting to a remote storage (e.g., cloud storage) that includes the remote file. In some embodiments, the user interface can enable a user to link an image capture device or audio capture device, such as a camera, microphone, or other hardware to capture images or other sensory content and provide it to the font recommendation system 900. In some embodiments, the user interface manager 902 enables the user to select a specific portion of the input image or input text for processing. For example, the user interface may allow the user to crop or otherwise apply visual edits to the input image, select a portion of text such as a word or character within the input image or input text to be processed. Additionally, the user interface manager 902 allows users to request the font recommendation system 900 to generate one or more recommended fonts from the provided input data.

As illustrated in FIG. 9, the font recommendation system 900 includes an intent extraction engine 904. The intent extraction engine 904 may be a trained machine learning model that extracts one or more intents from the input image or input text from the user received by user interface manager 902. The intent extraction engine 904 can output the intents to the intent embedding generator 906. The intent embedding generator 906 can generate an intent embedding for the intents. In some embodiments, the intent extraction engine 904 can include a knowledge graph that maps sets of intents to the input image or input text. The intent extraction engine 904 can be a trained transformer model which receives a text sample (sentence, or a phrase or a word) and predicts the top intent from a taxonomy. In some embodiments, the intent extraction engine can be a pre-trained model such as DistilBert. Examples of text to intent extractions are included below in Table 1.

TABLE 1

| Text sample | Predicted Top Intent |
| --- | --- |
| wish you a merry christmas | christmas |
| (432)-553-**** rfranklin@webpartners.com | business |
| on february 14th at 5pm, you're invited for an evening of fine dining, music & love. | invite |
| please join us at the greyfred ballroom, the flance hotel at 455 bakefreed street, austin, tx | party |
| I love you mom, thanks for being there | mother |
| Enjoy the winter break | winter |

In another example, the intent extraction engine 904 can extract intent from input images. The intent extraction engine can be trained to extract intent classes from images. The intent classes summarize both a mood as well as an object understanding. In this aspect, the intent extraction engine 904 differs from traditional object recognition models because the intent extraction engine 904 identifies one or more moods such as "happy, surprised, encouraging", along with actions "teaching, swimming, reading" and objects "balloons, apple, girl". An example mapping of object class and example intents are shown below in Table 2. By determining an intent class, the intent extraction engine 904 can generate intents that represent actions and objects rather than just objects. The intent extraction engine 904 can thus generate different intents from visually similar images.

TABLE 2

| Object Class | Example Intents |
| --- | --- |
| Action | Reading, eating, teaching |
| Object | Girl, boy, apple, hair |
| Events | Birthday party, anniversary, Halloween |
| Emotions | Happy, surprised, sad, shocked |

As illustrated in FIG. 9, the font recommendation system 900 includes an intent embedding generator 906. The intent embedding generator 906 may use the output of the intent extraction engine 904 to generate an intent embedding for the image input or text input. The intent embedding generator 906 can use one or more trained machine learning model(s) 916 to represent the intent of the image input or text input in an embedding space. The intent embedding generator 906 can also use one or more trained machine learning model(s) 916 to generate candidate font embeddings 920. For example, the intent embedding generator 906 can generate each font embedding of the candidate font embeddings 920 based on an intent or set of intents associated with a font and text pair for each font used during an offline process.

As illustrated in FIG. 9, the font recommendation system 900 includes an embedding comparison engine 910. The embedding comparison engine 910 can compare the candidate font embeddings 920 and the intent embedding for the image input or text input. For example, as discussed, the embedding comparison engine 910 can determine a font recommendation based on a comparison of the distances between positions of the intent embedding for the modal input and one or more of the candidate font embeddings 920.

As illustrated in FIG. 9, the font recommendation system 900 also includes the storage manager 912. The storage manager 912 maintains data for the font recommendation system 900. The storage manager 912 can maintain data of any type, size, or kind as necessary to perform the functions of the font recommendation system 900.

The storage manager 912, as shown in FIG. 9, includes the modal inputs 918. The modal inputs 918 can include an image input or a text input, as discussed in additional detail above. In particular, in one or more embodiments, the modal inputs 918 include text input or image inputs that include intents that can be utilized to train one or more machine learning model(s) to improve font recommendation providing additional training data for any of the machine learning model(s) based on input text, image input, or other factors described herein.

As further illustrated in FIG. 9, the storage manager 912 also includes candidate font embeddings 920. The candidate font embeddings 920 can include font embeddings generated from the intents extracted from training data 922 during the offline process. The storage manager 912 may also include training data 922. The training data 922 can include font/text pairs, images or text inputs that include objects, words, characters, or other visual elements that include a font style. The storage manager 912 may also include recommended fonts 924 that are output from the embedding comparison engine 910. The recommended fonts 924 may be stored and associated with image inputs, text inputs, and the like.

As depicted by FIG. 9, the font recommendation system 900 includes a training manager 930. For example, the training manager 930 may be one or more applications, devices, that conduct a training process for machine learning model(s) such as the intent embedding generator, machine learning model(s) 116, or other machine learning model(s) described herein. The training manager 930 can teach, guide, tune, and/or train one or more neural networks. In particular, the training manager 913 can train a neural network based on a plurality of training data (e.g., training data 922). As discussed, the training data 922 may include or have access to a set of font/text pairs or other font-intent training data. The set of intents associated with each font be sampled to include the most frequently occurring intents such that the resulting set of intents may be used to train the neural networks. More specifically, the training manager 930 can access, identify, generate, create, and/or determine training input and utilize the training input to train and fine-tune a neural network. For instance, the training manager 930 can train the intent embedding generator 906 and the machine learning model(s) 916, as discussed above.

Each of the components 902-930 of the font recommendation system 900 and their corresponding elements (as shown in FIG. 9) may be in communication with one another using any suitable communication technologies. It will be recognized that although components 902-930 and their corresponding elements are shown to be separate in FIG. 9, any of components 902-930 and their corresponding elements may be combined into fewer components, such as into a single facility or module, divided into more components, or configured into different components that may serve a particular embodiment.

The components 902-930 and their corresponding elements can comprise software, hardware, or both. For example, the components 902-930 and their corresponding elements can comprise one or more instructions stored on a computer-readable storage medium and executable by processors of one or more computing devices. When executed by the one or more processors, the computer-executable instructions of the font recommendation system 900 can cause a client device and/or a server device to perform the methods described herein. Alternatively, the components 902-930 and their corresponding elements can comprise hardware, such as a special purpose processing device to perform a certain function or group of functions. Additionally, the components 902-930 and their corresponding elements can comprise a combination of computer-executable instructions and hardware.

Furthermore, the components 902-930 of the font recommendation system 900 may, for example, be implemented as one or more stand-alone applications, as one or more modules of an application, as one or more plug-ins, as one or more library functions or functions that may be called by other applications, and/or as a cloud-computing model. Thus, the components 902-930 of the font recommendation system 900 may be implemented as a stand-alone application, such as a desktop or mobile application. Furthermore, the components 902-930 of the font recommendation system 900 may be implemented as one or more web-based applications hosted on a remote server. Alternatively, or additionally, the components of the font recommendation system 900 may be implemented in a suit of mobile device applications or "apps." To illustrate, the components of the font recommendation system 900 may be implemented as part of an application, or suite of applications, including but not limited to ADOBE CREATIVE CLOUD, ADOBE PHOTOSHOP, ADOBE ACROBAT, ADOBE ILLUSTRATOR, ADOBE LIGHTROOM and ADOBE INDESIGN. "ADOBE", "CREATIVE CLOUD," "PHOTOSHOP," "ACROBAT," "ILLUSTRATOR," "LIGHTROOM," and "INDESIGN" are either registered trademarks or trademarks of Adobe Inc. in the United States and/or other countries.

Figure 10:
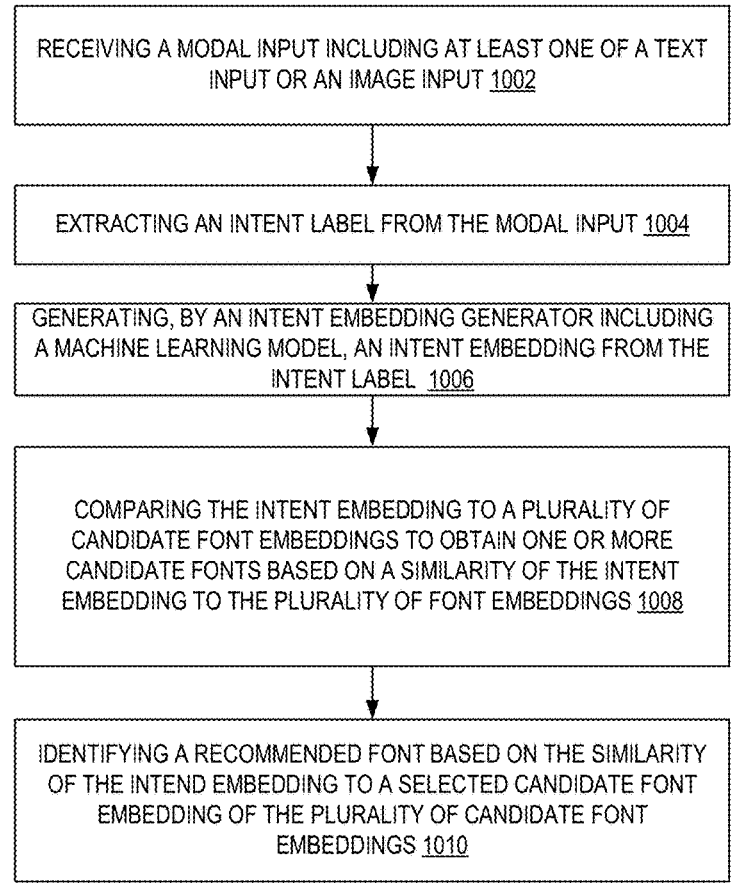
FIG. 10 illustrates a flowchart of a series of acts in a method of multimodal input contextual font recommendations in accordance with one or more embodiments.

FIGS. 1-9, the corresponding text, and the examples, provide a number of different systems and devices that allows a user to perform multimodal contextual font recommendation. In addition to the foregoing, embodiments can also be described in terms of flowcharts comprising acts and steps in a method for accomplishing a particular result. For example, FIG. 10 illustrates a flowchart of an exemplary method in accordance with one or more embodiments. The method described in relation to FIG. 10 may be performed with fewer or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart 1000 of a series of acts in a method of multimodal input contextual font recommendations in accordance with one or more embodiments. In one or more embodiments, the method 1000 is performed in a digital medium environment that includes the font recommendation system 900. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of receiving a modal input including at least one of a text input or an image input. The font recommendation system can receive the modal input via the user interface manager or from another computing device. While the act 1002 is described in the context of user input, it will be understood that receiving input from another computing device does not require a user interaction.

In one example, a user can input text from an input device such as a keyboard of a user device, that can be communicatively coupled to the font recommendation system. The input text may include one or more words that may include letters, special characters, or other visual characters. The font recommendation system can also receive the input text from another computing device, such as a content server, a media distribution system, or the like.

In another example, a user can provide an input image from an image store, a storage service, or capture the input image with a camera. The input image may include one or more objects that may include letters, words, or other visual characters. In other embodiments, the font recommendation system can receive the input image from another computing device, such as a content server, a media distribution system, or the like.

As illustrated in FIG. 10, the method 1000 includes an act 1004 of extracting an intent label from the modal input. The font recommendation system can extract objects, words, or characters included in the image input or the text input. The font recommendation system can determine one or more intents associated with the objects, words, or characters of the image input or text input. In a non-limiting example, the image input may include a cake decorated with two rings in the design. The font recommendation engine may extract the cake shape, colors, ring objects, or the like and determine a set of intents that include aspects of the input image or text input.

As illustrated in FIG. 10, the method 1000 includes an act 1006 of generating, by an intent embedding generator including a machine learning model, an intent embedding from the intent label. The font recommendation system can generate an intent embedding in an embedding space that represents the set of intents associated with the intent label. The font recommendation system can generate a location of the intent embedding such that similar intents are positioned in nearby positions in the embedding space.

As illustrated in FIG. 10, the method 1000 includes an act 1008 of comparing the intent embedding to a plurality of candidate font embeddings to obtain one or more candidate fonts based on a similarity of the intent embedding to one or more of the candidate font embeddings in the embedding space. For instance, the font recommendation system can compute distances between a location representing the intent embedding from the image input or text input and the location of each of the candidate font embeddings.

As illustrated in FIG. 10, the method 1000 includes an act 1010 of identifying a recommended font based on the similarity of the intent embedding to a selected candidate font embedding of the plurality of candidate font embeddings. The font recommendation system can determine a recommended font by determining a minimum value of distance between the intent embedding and the candidate font embeddings.

Figure 11:
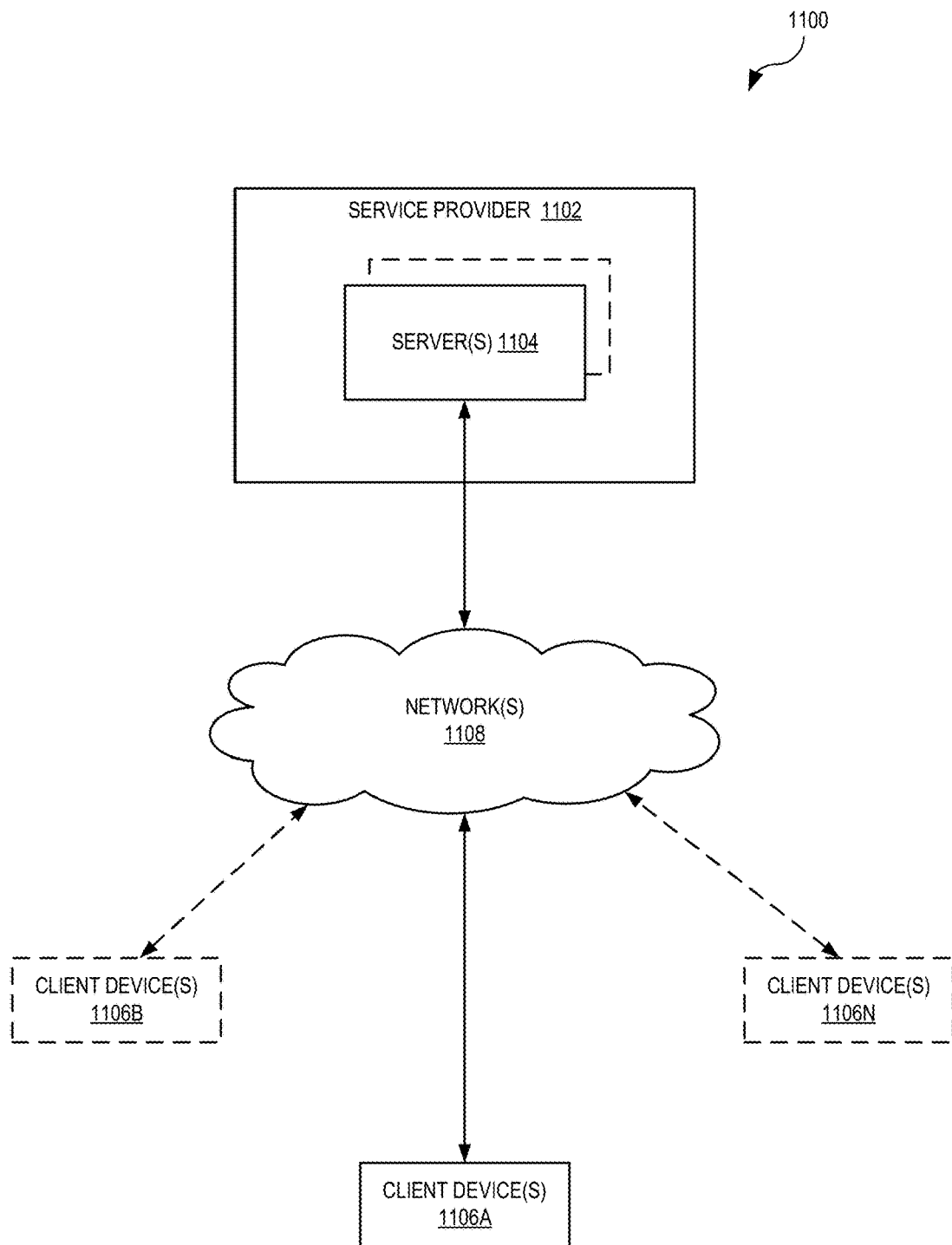
FIG. 11 illustrates a schematic diagram of an exemplary environment in which the font recommendation system can operate in accordance with one or more embodiments.

FIG. 11 illustrates a schematic diagram of an exemplary environment 1100 in which the font recommendation system 900 can operate in accordance with one or more embodiments. In one or more embodiments, the environment 1100 includes a service provider 1102 which may include one or more servers 1104 connected to a plurality of client devices 1106A-1106N via one or more networks 1108. The client devices 1106A-1106N, the one or more networks 1108, the service provider 1102, and the one or more servers 1104 may communicate with each other or other components using any communication platforms and technologies suitable for transporting data and/or communication signals, including any known communication technologies, devices, media, and protocols supportive of remote data communications, examples of which will be described in more detail below with respect to FIG. 12.

Although FIG. 11 illustrates a particular arrangement of the client devices 1106A-1106N, the one or more networks 1108, the service provider 1102, and the one or more servers 1104, various additional arrangements are possible. For example, the client devices 1106A-1106N may directly communicate with the one or more servers 1104, bypassing the network 1108. Or alternatively, the client devices 1106A-1106N may directly communicate with each other. The service provider 1102 may be a public cloud service provider which owns and operates their own infrastructure in one or more data centers and provides this infrastructure to customers and end users on demand to host applications on the one or more servers 1104. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1104. In some embodiments, the service provider may be a private cloud provider which maintains cloud infrastructure for a single organization. The one or more servers 1104 may similarly include one or more hardware servers, each with its own computing resources, which are divided among applications hosted by the one or more servers for use by members of the organization or their customers.

Similarly, although the environment 1100 of FIG. 11 is depicted as having various components, the environment 1100 may have additional or alternative components. For example, the environment 1100 can be implemented on a single computing device with the font recommendation system 900. In particular, the font recommendation system 900 may be implemented in whole or in part on the client device 1102A.

As illustrated in FIG. 11, the environment 1100 may include client devices 1106A-1106N. The client devices 1106A-1106N may comprise any computing device. For example, client devices 1106A-1106N may comprise one or more personal computers, laptop computers, mobile devices, mobile phones, tablets, special purpose computers, TVs, or other computing devices, including computing devices described below with regard to FIG. 12. Although three client devices are shown in FIG. 11, it will be appreciated that client devices 1106A-1106N may comprise any number of client devices (greater or smaller than shown).

Moreover, as illustrated in FIG. 11, the client devices 1106A-1106N and the one or more servers 1104 may communicate via one or more networks 1108. The one or more networks 1108 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1108 may be any suitable network over which the client devices 1106A-1106N may access service provider 1102 and server 1104, or vice versa. The one or more networks 1108 will be discussed in more detail below with regard to FIG. 12.

In addition, the environment 1100 may also include one or more servers 1104. The one or more servers 1104 may generate, store, receive, and transmit any type of data, including modal inputs 918, candidate font embeddings 920, training data 922, and recommended fonts 924, or other information. For example, a server 1104 may receive data from a client device, such as the client device 1106A, and send the data to another client device, such as the client device 1102B and/or 1102N. The server 1104 can also transmit electronic messages between one or more users of the environment 1100. In one example embodiment, the server 1104 is a data server. The server 1104 can also comprise a communication server or a web-hosting server. Additional details regarding the server 1104 will be discussed below with respect to FIG. 12.

As mentioned, in one or more embodiments, the one or more servers 1104 can include or implement at least a portion of the font recommendation system 900. In particular, the font recommendation system 900 can comprise an application running on the one or more servers 1104 or a portion of the font recommendation system 900 can be downloaded from the one or more servers 1104. For example, the font recommendation system 900 can include a web hosting application that allows the client devices 1106A-1106N to interact with content hosted at the one or more servers 1104. To illustrate, in one or more embodiments of the environment 1100, one or more client devices 1106A-1106N can access a webpage supported by the one or more servers 1104. In particular, the client device 1106A can run a web application (e.g., a web browser) to allow a user to access, view, and/or interact with a webpage or website hosted at the one or more servers 1104.

Upon the client device 1106A accessing a webpage or other web application hosted at the one or more servers 1104, in one or more embodiments, the one or more servers 1104 can provide access to one or more modal inputs (e.g., the modal inputs 918, such as an image file or a text file) stored at the one or more servers 1104. Moreover, the client device 1106A can receive a request (i.e., via user input) to recommend a font based on an image input or a text input and provide the request to the one or more servers 1104. Upon receiving the request, the one or more servers 1104 can automatically perform the methods and processes described above to generate a font recommendation. The one or more servers 1104 can provide one or more font recommendations, to the client device 1106A for display to the user.

As just described, the font recommendation system 900 may be implemented in whole, or in part, by the individual elements 1102-1108 of the environment 1100. It will be appreciated that although certain components of the font recommendation system 900 are described in the previous examples with regard to particular elements of the environment 1100, various alternative implementations are possible. For instance, in one or more embodiments, the font recommendation system 900 is implemented on any of the client devices 1106A-N. Similarly, in one or more embodiments, the font recommendation system 900 may be implemented on the one or more servers 1104. Moreover, different components and functions of the font recommendation system 900 may be implemented separately among client devices 1106A-1106N, the one or more servers 1104, and the network 1108.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
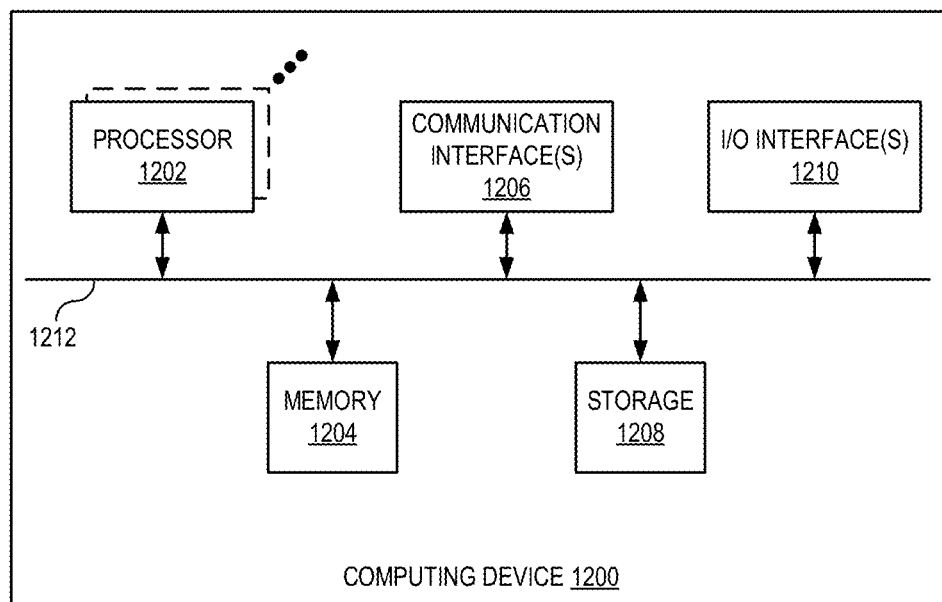
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that one or more computing devices such as the computing device 1200 may implement the image processing system. As shown by FIG. 12, the computing device can comprise a processor 1202, memory 1204, one or more communication interfaces 1206, a storage device 1208, and one or more I/O devices/interfaces 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1208 and decode and execute them. In various embodiments, the processor(s) 1202 may include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 can further include one or more communication interfaces 1206. A communication interface 1206 can include hardware, software, or both. The communication interface 1206 can provide one or more interfaces for communication (such as, for example, packet-based communication) between the computing device and one or more other computing devices 1200 or one or more networks. As an example, and not by way of limitation, communication interface 1206 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

The computing device 1200 includes a storage device 1208 includes storage for storing data or instructions. As an example, and not by way of limitation, storage device 1208 can comprise a non-transitory storage medium described above. The storage device 1208 may include a hard disk drive (HDD), flash memory, a Universal Serial Bus (USB) drive or a combination of these or other storage devices. The computing device 1200 also includes one or more input or output ("I/O") devices/interfaces 1210, which are provided to allow a user to provide input to (such as user strokes), receive output from, and otherwise transfer data to and from the computing device 1200. These I/O devices/interfaces 1210 may include a mouse, keypad or a keyboard, a touch screen, camera, optical scanner, network interface, modem, other known I/O devices or a combination of such I/O devices/interfaces 1210. The touch screen may be activated with a stylus or a finger.

The I/O devices/interfaces 1210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data may be representative of one or more graphical user interfaces and/or any other graphical content that may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   receiving a modal input including at least one of a text input or an image input;
   extracting a set of intents from the modal input;
   generating, by an intent embedding generator including a machine learning model, an intent embedding from the set of intents;
   comparing the intent embedding to a plurality of candidate font embeddings to obtain one or more candidate fonts based on a respective similarity of the intent embedding to each of the plurality of candidate font embeddings, wherein each candidate font embedding of the plurality of candidate font embeddings represents an intent of a respective font, wherein each candidate font embedding of the plurality of candidate font embeddings is based on text representing the intent of the respective font, and wherein candidate font embeddings of the plurality of candidate font embeddings that are closer in distance to each other in an embedding space represent fonts having more similar intents than candidate font embeddings of the plurality of candidate font embeddings that are farther in distance from each other in the embedding space; and
   identifying a recommended font based on the similarity of the intent embedding to a selected candidate font embedding of the plurality of candidate font embeddings.

2. The method of claim 1, wherein the machine learning model is trained by:
   obtaining a training data set, the training data set comprising a plurality of sets of font and text pairs;
   determining an intent for each font based on a respective font and text pair; and
   generating a font embedding for each font from the plurality of sets of font and text pairs using their corresponding intents.

3. The method of claim 1, wherein the machine learning model is a Siamese neural network trained using a triplet loss.

4. The method of claim 1, wherein identifying the recommended font based on the similarity of the intent embedding to the plurality of candidate font embeddings comprises:
   computing a distance in an embedding space, between the intent embedding and the plurality of candidate font embeddings; and
   determining a recommended font based on the distance between the intent embedding and one or more candidate font embedding of the plurality of candidate font embeddings.

5. The method of claim 1, wherein extracting the set of intents from the modal input comprises:
   determining a type of the modal input; and
   extracting, based on the type of the modal input, a plurality of intents associated with the modal input.

6. The method of claim 5, wherein extracting, based on the type of the modal input, a plurality of intents associated with the modal input, further comprises:
   providing the modal input to a transformer-based model, wherein the modal input is the text input; and
   receiving, from the transformer-based model, the plurality of intents associated with the modal input.

7. The method of claim 5, wherein extracting, based on the type of the modal input, a plurality of intents associated with the modal input, further comprises:
providing the modal input to an intent model, wherein the modal input is the image input; and
receiving, from the intent model, the plurality of intents associated with the modal input.

8. The method of claim 1 further comprising:
presenting, via a user interface, the recommended font, wherein presenting comprises applying the recommended font to the input text, an example text, or a text object of the input image.

9. A non-transitory computer-readable storage medium including instructions stored thereon which, when executed by at least one processor, cause the at least one processor to:
receive a modal input including at least one of a text input or an image input;
extract a set of intents from the modal input;
generate, by an intent embedding generator including a machine learning model, an intent embedding from the set of intents;
compare the intent embedding to a plurality of candidate font embeddings to obtain one or more candidate fonts based on a similarity of the intent embedding to the plurality of candidate font embeddings, wherein each candidate font embedding of the plurality of candidate font embeddings represents an intent of a respective font, wherein each candidate font embedding of the plurality of candidate font embeddings is based on text representing the intent of the respective font, and wherein candidate font embeddings of the plurality of candidate font embeddings that are closer in distance to each other in an embedding space represent fonts having more similar intents than candidate font embeddings of the plurality of candidate font embeddings that are farther in distance from each other in the embedding space; and
identify a recommended font based on the similarity of the intent embedding to a selected candidate font embedding of the plurality of candidate font embeddings.

10. The non-transitory computer-readable storage medium of claim 9, wherein the machine learning model is trained by instructions which, when executed by at least one processor, cause the at least one processor to:
receive a training data set, the training data set comprising a plurality of sets of font and text pairs;
determining an intent for each font based on a respective font and text pair; and
generate a font embedding for each font from the plurality of font and text pairs using their corresponding intents.

11. The non-transitory computer-readable storage medium of claim 9, wherein the machine learning model is a Siamese neural network trained using a triplet loss.

12. The non-transitory computer-readable storage medium of claim 9, wherein the instructions for identifying the recommended font further comprise instructions that when executed by at least one processor, cause the at least one processor to:
compute a distance in the embedding space, between the intent embedding and the plurality of candidate font embeddings; and
determine a recommended font based on the distance between the intent embedding and one or more candidate font embedding of the plurality of candidate font embeddings.

13. The non-transitory computer-readable storage medium of claim 9, wherein the instructions for extracting the set of intents from the modal input further comprise instructions that, when executed by at least one processor, cause the at least one processor to:
determining a type of the modal input; and
extracting, based on the type of the modal input, a plurality of intents associated with the modal input.

14. The non-transitory computer-readable storage medium of claim 13, wherein the instructions for extracting, based on the type of the modal input, a plurality of intents associated with the modal input further comprise instructions that, when executed by at least one processor, cause the at least one processor to:
provide the modal input to a transformer, wherein the modal input is the text input; and
receive, from the transformer, the plurality of intents associated with the modal input.

15. The non-transitory computer-readable storage medium of claim 13, wherein the instructions for extracting, based on the type of the modal input, a plurality of intents associated with the modal input further comprise instructions that, when executed by at least one processor, cause the at least one processor:
provide the modal input to an intent model, wherein the modal input is the image input; and
receive, from the intent model, the plurality of intents associated with the modal input.

16. The non-transitory computer-readable storage medium of claim 13 further comprising instructions that, when executed by at least one processor, cause the at least one processor to present, via a user interface, the recommended font, wherein causing the at least one processor to present comprises applying the recommended font to the input text, an example text, or a text object of the input image.

17. A system comprising:
a set of one or more processors; and
a memory including instructions which, when executed by the set of one or more processors, cause the system to:
receive a modal input including at least one of a text input or an image input;
extract a set of intents from the modal input;
generate, by an intent embedding generator including a machine learning model, an intent embedding from the set of intents;
compare the intent embedding to a plurality of candidate font embeddings to obtain one or more candidate fonts based on a similarity of the intent embedding to the plurality of candidate font embeddings, wherein each candidate font embedding of the plurality of candidate font embeddings represents an intent of a respective font, wherein each candidate font embedding of the plurality of candidate font embeddings is based on text representing the intent of the respective font, and wherein candidate font embeddings of the plurality of candidate font embeddings that are closer in distance to each other in an embedding space represent fonts having more similar intents than candidate font embeddings of the plurality of candidate font embeddings that are farther in distance from each other in the embedding space; and identify a recommended font based on the similarity of the intent embedding to a selected candidate font embedding of the plurality of candidate font embeddings.

18. The system of claim 17, wherein the machine learning model is trained by instructions which, when executed by a set of one or more processors of the system, cause the system to:
receive a training data set, the training data set comprising a plurality of sets of font and text pairs;
determining an intent for each font based on a respective font and text pair; and
generate a font embedding for each font from the plurality of font and text pairs using their corresponding intents.

19. The system of claim 17 wherein the instructions for identifying the recommended font further comprise instructions that, when executed by a set of one or more processors of the system, cause the system to:
compute a distance in an embedding space, between the intent embedding and the plurality of candidate font embeddings; and
determine a recommended font based on the distance between the intent embedding and one or more candidate font embedding of the plurality of candidate font embeddings.

20. The system of claim 17, wherein the instructions for extracting the set of intents from the modal input further comprise instructions that, when executed by a set of one or more processors of the system, cause the system to:
determining a type of the modal input; and
extracting, based on the type of the modal input, a plurality of intents associated with the modal input.

* * * * *